US007626889B2

(12) United States Patent
Seltzer et al.

(10) Patent No.: US 7,626,889 B2
(45) Date of Patent: Dec. 1, 2009

(54) SENSOR ARRAY POST-FILTER FOR TRACKING SPATIAL DISTRIBUTIONS OF SIGNALS AND NOISE

(75) Inventors: Michael L. Seltzer, Seattle, WA (US); Ivan Tashev, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 237 days.

(21) Appl. No.: 11/697,410

(22) Filed: Apr. 6, 2007

(65) Prior Publication Data

US 2008/0247274 A1 Oct. 9, 2008

(51) Int. Cl.
*G01S 3/80* (2006.01)
(52) U.S. Cl. ...................................... 367/125
(58) Field of Classification Search ............ 367/81–191
See application file for complete search history.

(56) References Cited

U.S. PATENT DOCUMENTS

| 5,574,824 | A | 11/1996 | Slyh et al. | |
|---|---|---|---|---|
| 6,526,147 | B1 | 2/2003 | Rung | |
| 6,594,367 | B1 * | 7/2003 | Marash et al. | ................. 381/92 |
| 7,035,416 | B2 | 4/2006 | Matsuo | |
| 7,103,541 | B2 | 9/2006 | Attias et al. | |
| 7,133,530 | B2 | 11/2006 | Poletti | |
| 7,165,026 | B2 | 1/2007 | Acero et al. | |
| 2004/0175006 | A1 | 9/2004 | Kim et al. | |
| 2005/0047611 | A1 | 3/2005 | Mao | |
| 2005/0281415 | A1 | 12/2005 | Lambert et al. | |
| 2006/0198536 | A1 | 9/2006 | Kushida | |
| 2006/0233389 | A1 | 10/2006 | Mao et al. | |
| 2008/0225041 | A1 * | 9/2008 | El Dokor et al. | ............ 345/419 |

FOREIGN PATENT DOCUMENTS

EP 1538867 A1 6/2006

OTHER PUBLICATIONS

Asoh, H., F. Asano, T. Yoshimura, K. Yamamoto, Y. Motomura, N. Ichimura, I. Hara, J. Ogata, An application of a particle filter to bayesian multiple sound source tracking with audio and video information fusion, Proc. of Intl. Conf. on Info. Fusion, 2004, pp. 805-812.

(Continued)

*Primary Examiner*—Thomas H Tarcza
*Assistant Examiner*—Luke D Ratcliffe
(74) *Attorney, Agent, or Firm*—Lyon & Harr, LLP; Mark A. Watson (57) ABSTRACT

A "Sensor Array Post-Filter" provides an adaptive post-filter that accurately models and suppresses both diffuse and directional noise sources as well as interfering speech sources. The post-filter is applied to an output signal produced by a beamformer used to process signals produced by a sensor array. As a result, the Sensor Array Post-Filter operates to improve the signal-to-noise ratio (SNR) of beamformer output signals by providing adaptive post-filtering of the output signals. The post-filter is generated based on a generative statistical model for modeling signal and noise sources at distinct regions in a signal field that considers prior distributions trained to model an instantaneous direction of arrival for signals captured by sensors in the array.

20 Claims, 4 Drawing Sheets

OTHER PUBLICATIONS

Dempster, A. P., N. M. Laird, D. B. Rubin, Maximum likelihood from incomplete data via the EM algorithm, J. of Royal Statistical Soc., vol. 39, No. 1, pp. 1-38, 1977.

Ephraim, Y., and D. Malah, Speech enhancement using a minimum mean-square error short-time spectral amplitude estimator, IEEE Trans. Acoust., Speech, Sig. Proc., Dec. 1984, vol. 32, No. 6, pp. 1109-1121.

Huo, Q., and C.-H. Lee, On-line adaptive learning of the continuous density hidden Markov model based on approximate recursive Bayes estimate, IEEE Trans. Speech Audio Proc., Mar. 1997, vol. 5, No. 2, pp. 161-172.

Malvar, H. S., A modulated complex lapped transform and its applications to audio processing, Proc. ICASSP-99, Phoeniz, AZ, Mar. 1999, pp. 1421-1424.

McAulay, R., and M. Malpass, Speech enhancement using a soft-decision noise suppression filter, IEEE Trans. Acoust., Speech, Sig. Proc., Apr. 1980, vol. 28, No. 2, pp. 137-145.

McCowan, I. A., and H. Boulard, Microphone array post-filter based on noise field coherence, IEEE Trans. Speech Audio Proc., Nov. 2003, vol. 11, No. 6, pp. 709-716.

Seltzer, M.L., Raj, B., Stern, R.M., Likelihood-maximizing beamforming for robust hands-free speech recognition, IEEE Trans. on Speech and Audio Processing, Sep. 2004, vol. 12, No. 5, pp. 489-498.

Sohn, J., Kim, N. S., and W. Sung, A statistical model-based voice activity detection, IEEE Sig. Proc. Lett., Jan. 2000, vol. 6, No. 1.

Tashev, I., M. Seltzer, A. Acero, Microphone array for headset with spatial noise suppressor, Proc. of Ninth Int'l Workshop on Acoustic, Echo and Noise Control, IWAENC 2005, Sep. 2005, Eindhoven, The Netherlands.

Valin, J.-M., Michaud, F., and Rouat, J., Robust 3D localization and tracking of sound sources using beamforming and particle filtering, 31st Int'l Conf. on Acoustics, Speech, and Signal Processing (ICASSP 2006), pp. 841-844, Toulouse, France.

Zelinski, R., A microphone array with adaptive post-filtering for noise reduction in reverberant rooms, Proc. ICASSP-88, 1988, vol. 5, pp. 2578-2581.

\* cited by examiner

SENSOR ARRAY POST-FILTER FOR TRACKING SPATIAL DISTRIBUTIONS OF SIGNALS AND NOISE

BACKGROUND

1. Technical Field

The invention is related to improving a signal-to-noise ratio (SNR) of signals captured by sensor arrays, and in particular, to a technique for post-filtering beamformer outputs to provide improved tracking of spatial distributions of signal and noise sources for use in increasing the SNR of array output signals.

2. Related Art

Localization of a signal source or direction within a prescribed region is an important element of many sensor array-based signal capture systems. For example, a number of conventional audio conferencing applications combine the input of microphones from a microphone array using conventional sound source localization (SSL) to enable speech or sound originating from a particular point or direction to be effectively isolated and processed as desired. Signals of other types (radar, radio, sonar, etc.) are also isolated using similar SSL-type techniques.

The ability to combine multiple signals captured from a sensor array is frequently implemented in beamforming systems for providing signal source localization. In general, beamforming operations are applicable to processing the signals of a number of receiving arrays, including microphone arrays, sonar arrays, directional radio antenna arrays, radar arrays, etc.

For example, in the case of a microphone array, beamforming involves processing output audio signals of the microphone array in such a way as to make the microphone array act as a highly directional microphone. In other words, beamforming provides a "listening beam" which points to, and receives, a particular sound source while attenuating other sounds and noise, including, for example, reflections, reverberations, interference, and sounds or noise coming from other directions or points outside the primary beam, thereby providing a higher SNR for sound signals originating from within the target beam.

In general, a beamformer is basically a spatial filter that operates on the output of an array of sensors, such as microphones, in order to enhance the amplitude of a coherent wavefront relative to background noise and directional interference. A set of signal processing operators (usually linear filters) is then applied to the signals from each sensor, and the outputs of those filters are combined to form beams, which are pointed, or steered, to reinforce inputs from particular angular regions and attenuate inputs from other angular regions.

The SNR of the output signal generated by conventional beamformer or SSL-based systems is often further enhanced using conventional post-processing or post-filtering techniques. In general, such techniques operate by applying additional post-filtering algorithms for sensor array outputs to enhance beamformer output signals.

For example, microphone array processing algorithms generally use a beamformer to jointly process the signals from all microphones to create a single-channel output signal with increased directivity and thus higher SNR compared to a single microphone. This output signal is then often further enhanced by the use of a single channel post-filter for processing the beamformer output in such a way that the SNR of the output signal is significantly improved relative to the SNR produced by use of the beamformer alone.

Unfortunately, one problem with conventional beamformer post-filtering techniques is that they generally operate on the assumption that any noise present in the signal is either incoherent or diffuse. As such, these conventional post-filtering techniques generally fail to make allowances for point noise sources which may be strongly correlated across the sensor array. Consequently, the SNR of the output signal is not generally improved relative to highly correlated point noise sources.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A "Sensor Array Post-Filter," as described herein, provides an adaptive post-filter that accurately models and suppresses both diffuse and directional noise sources as well as interfering speech sources in an output signal produced by a beamformer applied to audio signals produced by a microphone array. As a result, the Sensor Array Post-Filter operates to improve the signal-to-noise ratio (SNR) of beamformer output signals by providing adaptive post-filtering of the output signals.

In general, the Sensor Array Post-Filter constructs a statistical model for modeling signal and noise sources at distinct regions in a signal field captured by a sensor array. Model parameters are adapted over time using probabilistic learning techniques, such as, for example, an expectation-maximization (EM) based incremental Bayesian learning technique. The probabilistic model is then used to derive an adaptive post-filter that is applied to a beamformer output. Application of the adaptive model to the beamformer output allows the Sensor Array Post-Filter to perform various operations including accurately modeling and suppressing both diffuse and directional noise sources, modeling and suppressing interfering signal sources, and tracking or locating signal and noise sources within the signal field.

In view of the above summary, it is clear that the Sensor Array Post-Filter described herein provides a unique system and method for improving the SNR of beamformer output signals by providing adaptive post-filtering of the output signals. In addition to the just described benefits, other advantages of the Sensor Array Post-Filter will become apparent from the detailed description that follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
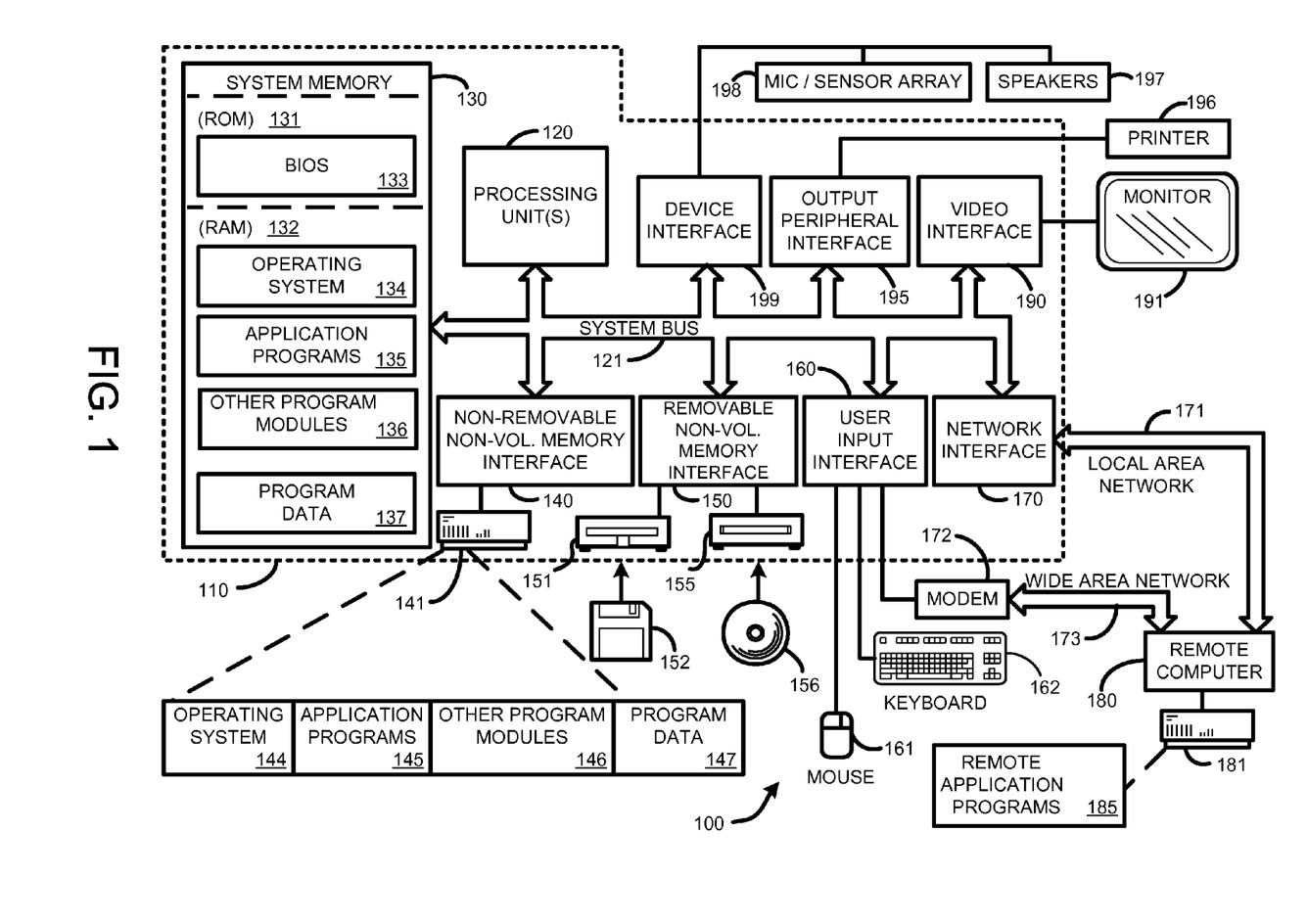
FIG. 1 is a general system diagram depicting a general-purpose computing device constituting an exemplary system for implementing a Sensor Array Post-Filter, as described herein.
Figure 2:
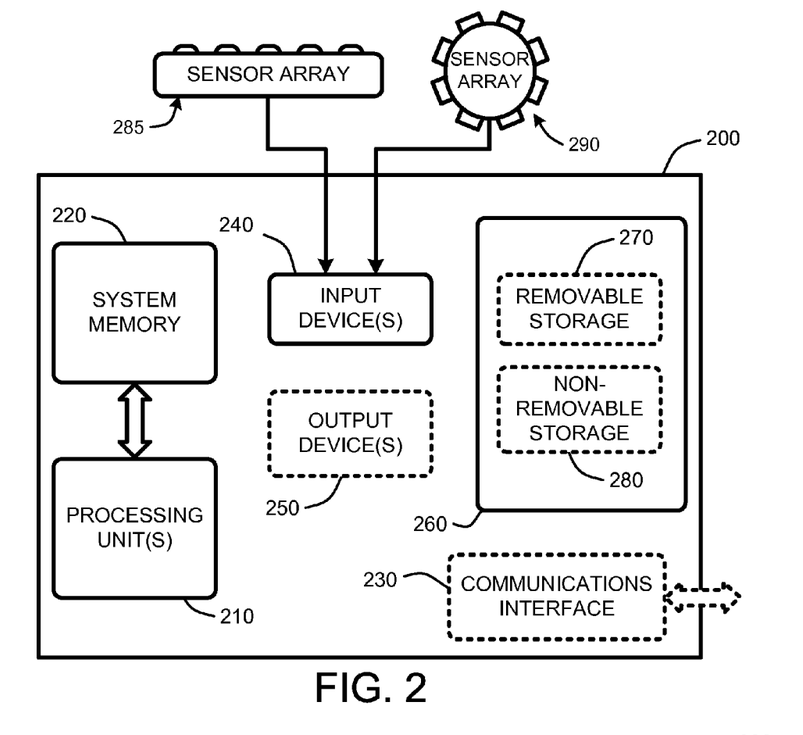
FIG. 2 is a general system diagram depicting a general device having simplified computing and I/O capabilities for use in implementing the Sensor Array Post-Filter, as described herein.

1.0 Exemplary Operating Environment:

FIG. 1 and FIG. 2 illustrate two examples of suitable computing environments on which various embodiments and elements of a Sensor Array Post-Filter, as described herein, may be implemented.

For example, FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with hardware modules, including components of a microphone array 198, or other sensor array (not shown), including, for example, directional antenna arrays, radar arrays receiver arrays, sonar arrays, etc. These sensor arrays are generally connected to the computing system 100 via a device interface 199, including conventional wired or wireless interfaces, such as, for example, parallel, serial, USB, IEEE 1394, Bluetooth™, WiFi, fiber-optic, etc.

Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media such as volatile and nonvolatile removable and non-removable media implemented in any method or technology for storage of information such as computer readable instructions, data structures, program modules, or other data.

For example, computer storage media includes, but is not limited to, storage devices such as RAM, ROM, PROM, EPROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

Other input devices (not shown) may include a joystick, game pad, satellite dish, scanner, radio receiver, and a television or broadcast video receiver, or the like. These and other input devices are often connected to the processing unit 120 through a wired or wireless user input interface 160 that is coupled to the system bus 121, but may be connected by other conventional interface and bus structures, such as, for example, a parallel port, a game port, a universal serial bus (USB), an IEEE 1394 interface, a Bluetooth™ wireless interface, an IEEE 802.11 wireless interface, etc.

A monitor 191 or other type of display device is also connected to the system bus 121 via an interface, such as a video interface 190. In addition to the monitor, computers may also include other peripheral output devices such as a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

With respect to FIG. 2, this figure shows a general system diagram showing a simplified computing device. Such computing devices can be typically be found in devices having at least some minimum computational capability in combination with a communications interface, including, for example, cell phones PDA's, dedicated media players (audio and/or video), etc. It should be noted that any boxes that are represented by broken or dashed lines in FIG. 2 represent alternate embodiments of the simplified computing device, and that any or all of these alternate embodiments, as described below, may be used in combination with other alternate embodiments that are described throughout this document.

At a minimum, to allow a device to implement the Sensor Array Post-Filter, the device must have some minimum computational capability and some memory or storage capability in combination with the output of one or more sensor arrays for providing an input signal. In particular, as illustrated by FIG. 2, the computational capability is generally illustrated by processing unit(s) 210 (roughly analogous to processing units 120 described above with respect to FIG. 1). Note that in contrast to the processing unit(s) 120 of the general computing device of FIG. 1, the processing unit(s) 210 illustrated in FIG. 2 may be specialized (and inexpensive) microprocessors, such as a DSP, a VLIW, or other micro-controller rather than the general-purpose processor unit of a PC-type computer or the like, as described above.

In addition, the simplified computing device of FIG. 2 may also include other components, such as, for example one or more input devices 240 such as sensor array 285 or sensor array 290. Note that as is well known to those skilled in the art, sensor arrays can be implemented into integrated units, such as a single device that includes multiple sensors, or distributed as multiple devices comprising a sensor net for forming a sensor array. The simplified computing device of FIG. 2 may also include other optional components, such as, for example one or more output devices 250 (analogous to the output devices described with respect to FIG. 1). Finally, the simplified computing device of FIG. 2 also includes storage 260 that is either removable 270 and/or non-removable 280 (analogous to the storage devices described above with respect to FIG. 1).

The exemplary operating environment having now been discussed, the remaining part of this description will be devoted to a discussion of the program modules and processes embodying a "Sensor Array Post-Filter" which provides a unique system and method for providing post-filtering of a beamformer output signal generated from a sensor array.

2.0 Introduction:

A "Sensor Array Post-Filter," as described herein, provides an adaptive post-filter that accurately models and suppresses both diffuse and directional noise sources as well as interfering speech sources in an output signal produced by a beamformer applied to audio signals produced by a microphone array. As a result, the Sensor Array Post-Filter operates to improve the signal-to-noise ratio (SNR) of beamformer output signals by providing adaptive post-filtering of the output signals.

Note that throughout this document, discussion of the post-filtering or post-processing techniques provided by the Sensor Array Post-Filter will generally refer to speech and noise sources captured via a microphone array. However, it should be clear that the techniques described herein are equally applicable to signal and noise sources of various types captured by various types of sensor arrays. Examples of the various types of sensor arrays applicable for use with the Sensor Array Post-Filter include, for example, sound source localization (SSL) systems based on microphone array inputs, radio source location systems based on directional antenna array inputs, target location and tracking systems based on radar receiver arrays, target location and tracking systems based on sonar arrays, etc.

Figure 3:
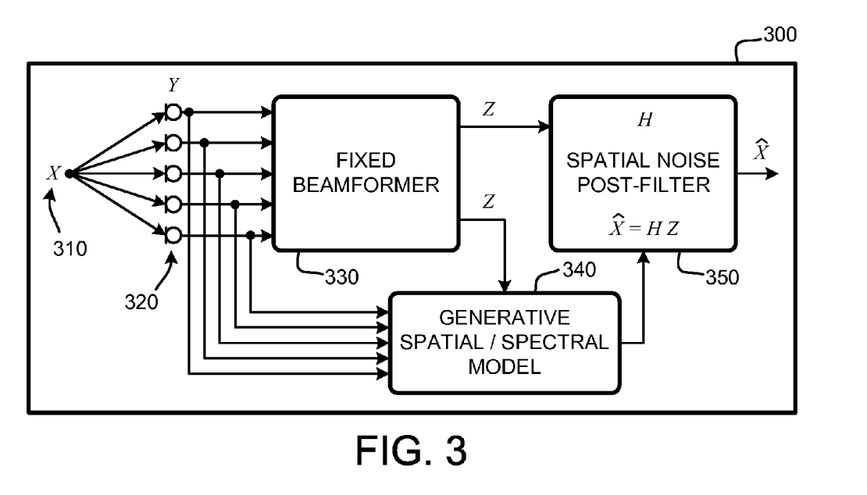
FIG. 3 illustrates an operational overview of one embodiment of the Sensor Array Post-Filter, as described herein.

2.1 System Overview:

In general, as illustrated by FIG. 3, the Sensor Array Post-Filter 300 provides a post-filter, H, 350 for processing beamformer 330 outputs, Z, derived from frequency domain coefficients, Y, of inputs, X, 310 of a sensor array 320. In general, the post-filter is based derived on a probabilistic model 340 for tracking spectral and spatial distributions of signal and noise sources captured by the sensor array. This probabilistic model is a generative statistical model for modeling signal and noise sources at distinct regions in a signal field captured by the sensor array.

In particular, given the frequency domain transform coefficients, the Sensor Array Post-Filter first estimates an instantaneous direction of arrival (IDOA) vector for each frequency bin of the frequency domain representation of the sensor array input signals. IDOA vectors provide an indication of the direction from which a signal and/or point noise source originated. These IDOA vectors, together with the current parameters of the statistical model, are then used to estimate updated values of the parameters of the spatial/spectral model of the signal field.

Note that as discussed in further detail in Section 3, the values of the parameters of the statistical model are computed based on the probability that the observed IDOA vectors originated in different regions of the array's work area, and as measured using pre-computed probability distributions, referred to herein as IDOA distributions or IDOA priors, derived from a set of training data. Training of IDOA distributions is performed prior to processing array signals. However, this training does not need to be repeated once it is initially performed for a particular sensor array. Consequently, in one embodiment, IDOA distribution training is performed offline, with the results then being provided as a prior probability distribution of IDOA vectors for use in real-time processing as part of the model parameter estimation. In addition, it should be noted that training of the IDOA prior distribution can be performed using either synthetic or actual sensor data where each data element originates from a known spatial point or direction.

Once being initially estimated, parameters of the model are adapted over time using probabilistic learning techniques, such as, for example, an expectation-maximization (EM) based incremental Bayesian learning technique. The probabilistic model is then used to derive an adaptive post-filter that is applied to the beamformer output. Application of the adaptive model to the beamformer output allows the Sensor Array Post-Filter to perform various operations including accurately modeling and suppressing both diffuse and directional noise sources, modeling and suppressing interfering signal sources, and tracking or locating signal and noise sources within the signal field.

Figure 4:
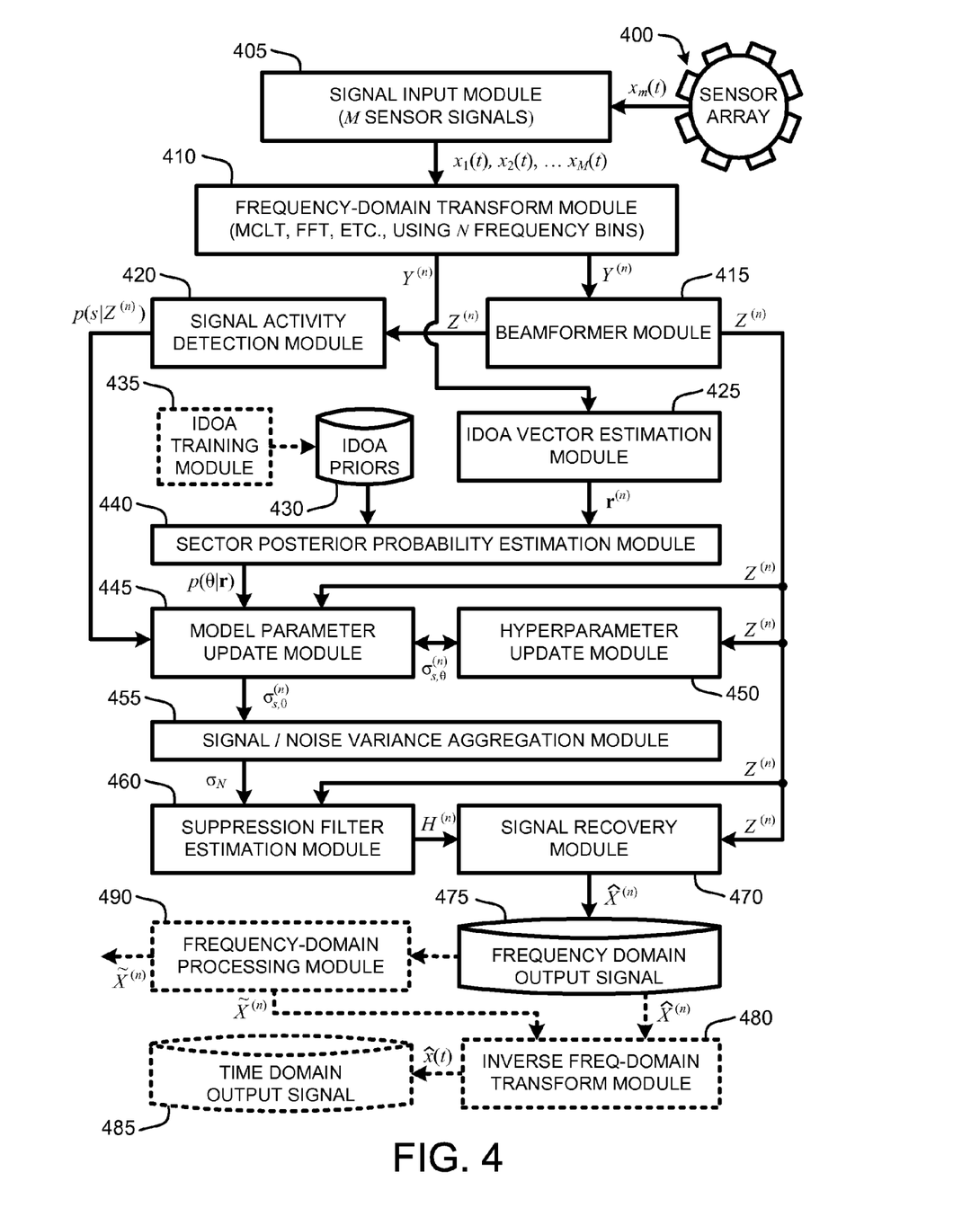
FIG. 4 provides an exemplary architectural flow diagram that illustrates program modules for implementing the Sensor Array Post-Filter, as described herein.

2.2 System Architectural Overview:

The processes summarized above are illustrated by the general system diagram of FIG. 4. In particular, the system diagram of FIG. 4 illustrates the interrelationships between program modules for implementing the Sensor Array Post-Filter, as described herein. It should be noted that any boxes and interconnections between boxes that are represented by broken or dashed lines in FIG. 4 represent alternate embodiments of the Sensor Array Post-Filter described herein, and that any or all of these alternate embodiments, as described below, may be used in combination with other alternate embodiments that are described throughout this document.

Further, it should be noted that while FIG. 4 illustrates the use of a microphone array for receiving audio signals, the Sensor Array Post-Filter is fully capable of being adapted for use with other sensor arrays, including, for example, microphone arrays, directional antenna arrays, radar receiver arrays, sonar arrays, etc. However, for purposes of explanation, the use of a microphone array for processing speech and noise is described in the following paragraphs. Extension to other signal and array types should be obvious to those skilled in the art in view of the following discussion.

In general, as illustrated by FIG. 4, the Sensor Array Post-Filter begins operation by using a signal input module 405 to receive a plurality of input signals from a sensor array 400, with one input signal, $x_i(t)$, originating from each of M sensors in the array. Note that in various embodiments, the input signals received from the sensor array 400 are either provided from a real-time signal source or from a stored signal source. In either case, live or recorded, processing of the array 400 input signals proceeds in the same manner.

Specifically, the signal input module 405 provides consecutive overlapping frames of time-domain samples of the array input signals to a frequency-domain transform module 410 that transforms each overlapping frame of each time-domain audio signal (or other array/signal type) into corresponding blocks of frequency-domain transform coefficients, $Y^{(n)}$, for each input signal. Note the frequency-domain transform module 410 can be implemented using any of a number of conventional transform techniques, including, for example, FFT-based techniques, modulated complex lapped transform (MCLT) based techniques, etc. Such transform techniques are well known to those skilled in the art, and will not be described in detail herein.

Next, once each frame of each input signal has been converted from the time-domain to the frequency-domain by the frequency-domain transform module 410, the corresponding blocks of frequency-domain transform coefficients, $Y^{(n)}$, are provided to a beamformer module 415 that applies conventional beamforming techniques, such as, for example, conventional delay-and-sum or MVDR-based beamforming, to produce a single channel output, $Z^{(n)}$, that enhances the signal from a target direction, for each frequency bin of the transform coefficients. Note that in various embodiments, rather than use a beamformer the Sensor Array Post-Filter can simply select the output of one sensor in the array using any technique desired so that a single channel is output from the overall array.

In addition, the transform coefficients of the beamformer output, $Z^{(n)}$, are used to compute a per-bin probability of signal presence, $p(s|Z^{(n)})$, using a signal activity detection module 420 to determine a probability of whether the current frame includes a signal, s. For example, in the case of a microphone array used to capture speech signals, a conventional voice activity detector (VAD) is implemented in the signal activity detection module 415 to compute this probability. Specifically, in the case of a speech signal, the signal activity detection module 415 uses a VAD to compute a probability of speech activity in each frequency bin of the transform coefficients of $Z^{(n)}$. Note that different signal activity detectors may be used, depending upon the signal type.

Next, the Sensor Array Post-Filter uses an IDOA vector estimation module 425 to compute an instantaneous direction of arrival (IDOA) vector, $r^{(n)}$, from the frequency domain transform coefficients, $Y^{(n)}$. The IDOA vector, $r^{(n)}$ is then provided to a sector probability estimation module 440 along with a set of IDOA priors to estimate a probabilistic direction or sector of the signal field, $p(\theta|r)$, for the IDOA vector, $r^{(n)}$. As discussed in further detail in Section 3.3 the IDOA priors 430 are estimated by using an IDOA training module 435 to compute a set of prior distributions over the sensor array space (i.e., the space or region from which the sensor array is capturing signals). Training of IDOA prior distributions is done using either synthetic or actual sensor data where each data element originates from a known spatial point or direction, and is generally performed offline prior to processing array signals. Further, this training of IDOA priors 430 does not need to be repeated unless the signal capture characteristics of the sensor array 400 change for some reason.

Next, the Sensor Array Post-Filter uses the IDOA vector, $r^{(n)}$, the beamformer module 415 output, $Z^{(n)}$, the probability of signal presence, $p(s|Z^{(n)})$, and the output, $p(\theta|r)$, of the sector posterior probability estimation module 440 to form an initial model of speech and noise for each sector or region of the sensor array space. Model parameters and hyperparameters (i.e., model parameters of the prior distribution) are updated in an iterative expectation-maximization (EM) process using a model parameter update module 445 in combination with a hyperparameter update module 450. See Sections 3.4 and 3.5 for more details regarding EM-based model updates.

Once the iterative EM-based learning process has been completed for estimating model parameters, the Sensor Array Post-Filter uses a signal/noise variance aggregation module 455 to merge spatially distinct parameter estimates of the model of speech and noise to create a single speech variance and a single noise variance. These variances are then passed to a suppression filter estimation module 460 that evaluates the aggregate speech and noise variances in combination with the beamformer output to create a final post-filter, $H^{(n)}$. Note that in constructing the final post-filter, it is assumed that the sector that contains the desired target signal is known a priori. Consequently, the post filter acts to suppress or attenuate both noise that comes from any direction, and any speech that originates from a direction (sector) other than the target sector. A signal recovery module 470 then applies this final post-filter, $H^{(n)}$, to the beamformer output, $Z^{(n)}$, to generate a frequency-domain output signal, $\hat{X}^{(n)}$, 475.

Once the frequency-domain output signal, $\hat{X}^{(n)}$, 475, has been computed, the Sensor Array Post-Filter stores that signal for use as desired. For example, in one embodiment, an inverse frequency domain transform module 480 transforms the frequency-domain estimate, $\hat{X}^{(n)}$, 475 back into the time domain by applying the inverse of the transform applied by the frequency-domain transform module 410. As such, the output of the inverse frequency domain transform module 480 is an output signal, $\hat{x}(t)$, 485 that represents the speech (or point noise) signal coming from a particular sector or region of the sensor array space, with other, interfering speech and point noise sources having been removed from the time-domain output signal. In other words, by tracking the spatial distributions of signal and noise sources, the final post-filter is able to increase the SNR of the beamformer output signals. This time-domain output signal, $\hat{x}(t)$, 485 is then either stored for later use, or provided for playback using conventional playback techniques.

In another embodiment, prior to providing the frequency-domain signal, $\hat{X}^{(n)}$, 475, to the inverse frequency domain transform module 480, the Sensor Array Post-Filter first uses a frequency-domain processing module 490 to perform any other desired conventional frequency domain operations on the frequency-domain signal, $\hat{X}^{(n)}$, 475. As is known to those skilled in the art, there are a very large number of frequency domain operations that can be performed on the transform coefficients of a signal, such as, for example, noise suppression, encoding or transcoding the signal (for storage or transmission), scaling the signal, watermarking the signal, identifying the signal using conventional signal fingerprinting techniques, conversion to features for speech recognition, etc.

3.0 Operation Overview:

The above-described program modules are employed for implementing the Sensor Array Post-Filter. As summarized above, the Sensor Array Post-Filter provides a post-filter for processing beamformer outputs derived from frequency domain coefficients of the inputs of a sensor array to provide improved tracking of spatial distributions of signal and noise sources, thereby increasing the SNR of array output signals. The following sections provide a detailed discussion of the operation of the Sensor Array Post-Filter, and of exemplary methods for implementing the program modules described in Section 2 with respect to FIG. 3 and FIG. 4.

3.1 Operational Details of the Sensor Array Post-Filter:

The following paragraphs detail specific operational and alternate embodiments of the Sensor Array Post-Filter described herein. In particular, the following paragraphs describe details of the Sensor Array Post-Filter operation, including: beamforming and post-filtering overview; instantaneous direction of arrival (IDOA); modeling spatial distributions of speech and noise; iteratively learning model parameters; and post-filter construction.

3.2 Beamforming and Post-Filtering Overview:

In general, as discussed above, the Sensor Array Post-Filter provides a post-filter, H, for processing beamformer outputs, Z, derived from frequency domain coefficients, Y, of inputs, X, of a sensor array. In general, the post-filter is based on a probabilistic generative model for tracking spectral and spatial distributions of signal and noise sources captured by the sensor array using beamforming techniques. This probabilistic model is basically a generative statistical model for modeling signal and noise sources at distinct regions in a signal field captured by the sensor array. Again, as noted above, the Sensor Array Post-Filter is applicable for use with a variety of sensor array types and signal types. However, for purposes of explanation, the following discussion will refer to the Sensor Array Post-Filter in terms of a microphone array for processing speech and point noise sources.

In general, once the microphone array captures the sound signals, and those signals are transformed into the frequency domain, all additional processing of the array input is performed in the short-time spectral domain (up to the point where the signal is converted back into the time domain for storage or playback). In particular, assuming that the sensor array is a microphone array for purposes of explanation, a speech signal $X(\omega,t)$ is captured by an array of M microphones. The M signals captured by the microphones are transformed to the frequency domain, $Y(\omega,t)=\{Y_1(\omega,t),\ldots,Y_M(\omega,t)\}$, and are then processed by a conventional fixed beamformer, e.g. delay-and-sum or MVDR, to produce a single-channel output signal, $Z(\omega,t)$ for each frequency bin. The output signal is then processed by an adaptive post-filter $H(\omega,t)$ to generate an enhanced output signal $\hat{X}(\omega,t)$, having an improved SNR relative to the beamformer output.

The following discussion focuses on designing the adaptive post-filter $H(\omega,t)$ to exploit the spectral information in the beamformer output $Z(\omega,t)$ in combination with the spatial information contained in the array signals $Y(\omega,t)$.

3.3 Instantaneous Direction of Arrival (IDOA):

In general, for a microphone array, the phase differences at a particular frequency bin between the signals received at a pair of microphones give an indication of the instantaneous direction of arrival (IDOA) of a given sound source. As noted above, IDOA vectors provide an indication of the direction from which a signal and/or point noise source originates. Non-correlated noise will be evenly spread in this space, while the signal and ambient noise (correlated components)

will lie inside a hyper-volume that represents all potential positions of a sound source within the signal field.

For far field sound capture, the hyper-volume has an M−1 dimensional hypersurface as the distance is presumed approaching infinity. While various sensor array types can be used by the Sensor Array Post-Filter, the following discussion will describe the use of a linear microphone array. Linear microphone arrays can distinguish only one dimension—the incident angle, and the real space is represented by an M−1 dimensional hyperline. Therefore, assuming a linear microphone array, the IDOA given by the pair of microphones i and j is computed as illustrated by Equation 1, where:

$$r_{ij}(\omega,t) = \angle Y_i(\omega,t) - \angle Y_j(\omega,t) \quad \text{Equation 1}$$

Therefore, for an array of M microphones, a vector of IDOA estimates can be constructed using the phase differences of pairs of microphones for each sector of the space covered by the microphone array. In a tested embodiment, M−1 non-repeating pairs were used to compute the IDOA vectors as illustrated by Equation 2, where:

$$r_{\omega t} = [r_{12}(\omega,t), r_{13}(\omega,t), \ldots, r_{1M}(\omega,t)]^T \quad \text{Equation 2}$$

With respect to pairs of microphones, note that either more of fewer than M−1 non-repeating pairs can be used. For example, for a microphone array having four microphones, $m_1$, $m_2$, $m_3$, and $m_4$, possible non-repeating pairs of microphones include $m_{1,2}$, $m_{1,3}$, $m_{1,4}$, $m_{2,3}$, $m_{2,4}$, and $m_{3,4}$. Therefore, while Equation 2 illustrates the use of three microphone pairs, $m_{1,2}$, $m_{1,3}$, and $m_{1,4}$ (i.e., M−1 pairs) for a four element array, additional pairs can be used, if desired.

Note that the presence of both ambient noise and sensor noise makes it impossible to ascertain the direction corresponding to a particular IDOA vector with absolute certainty. It should also be noted that it is assumed that all frequency sub-bands can be processed independently. Consequently, the frequency variable ω is removed from all subsequent derivations and equations for simplicity. However, it should be understood that each frequency bin is processed as described in the following sections.

3.3.1 Training IDOA Prior Distributions:

As noted above, IDOA vectors, $r^{(n)}$, are computed using equations 1 and 2. Training of the IDOA priors is generally computed offline and provided as a set of priors along with the microphone array for use in constructing the final post-filter, H.

In order to compute the sector posteriors described below with respect to Equation 17, the Gaussian parameters (i.e., the IDOA PDFs, also referred to herein as the IDOA priors) illustrated below in Equation 9 must be estimated.

To train these parameters, synthetic training data was generated using conventional acoustic propagation principles and common noise models. Specifically, each of a plurality of sample locations for each sector is defined by its position. While any coordinate system can be used for defining these positions, a radial coordinate system, i.e., $c_l = \{\phi_l, \theta_l, \rho_l\}$, is described below for purposes of explanation, where $c_l$ represents the spatial location of the signal source. Then, for a given frequency, ω, the signal gain (and delay) to each microphone m is given by Equation 3, where:

$$G_m(l, \omega) = U_m(\omega, c_l) \frac{\exp(-j2\pi\omega \upsilon \|c_l - p_m\|)}{\|c_l - p_m\|} \quad \text{Equation 3}$$

where $p_m$ are the microphone coordinates, $\|c_l - p_m\|$ is the Euclidean distance between the microphone and the sound source, and ν is the local speed of sound. $U_m(\omega, c_l)$ is a model of the microphones response obtained from acoustical measurements. To model correlated noise gain, the response of a signal with random amplitude and position in the space is modeled as illustrated by Equation 4, where:

$$NC_m(l, \omega) = \mathcal{N}(0, \psi^{-1}) U_m(\omega, c_r) \frac{\exp(-j2\pi\omega \upsilon \|c_r - p_m\|)}{\|c_r - p_m\|} \quad \text{Equation 4}$$

where $c_r$ is a random position in the space and ψ is the signal to correlated noise ratio. Finally, uncorrelated noise gain (i.e., instrumental noise or other uncorrelated noise) is modeled for each microphone as $NN_m(l,\omega) = \mathcal{N}(0, \zeta^{-1})$, where ζ is the signal to non-correlated noise ratio. The signal model for each microphone is the superposition of all three components:

$$Y_m(l,\omega) = G_m(l,\omega) + NC_m(l,\omega) + NN_m(l,\omega) \quad \text{Equation 5}$$

In other words, the signal from each microphone, $Y_m(l,\omega)$, is modeled as the combination of point speech sources, $G_m(l, \omega)$, random point noise sources, $NC_m(l,\omega)$, and random microphone noise, $NN_m(l,\omega)$. Note that Equations 3 through 5 are presented as frequency domain computations. However, in an alternate embodiment, the training data can be computed as a time domain signal, and then transformed to the frequency domain.

In other words, for each of a plurality of points, $c_l$, in each sector, a plurality of data points, $Y_m$, representing a speech signal contaminated by some level of both correlated and non-correlated noise are automatically generated in accordance with Equations 3 through 5 for each microphone m. These data points represent the training data for each microphone that is used to compute the IDOA priors. Specifically, this training data, $Y_m$, is converted to IDOA vectors for pairs of microphones in accordance with Equation 1 and Equation 2. The mean and covariance of the resulting IDOA vectors are then computed for each sector and used as a model of the IDOA priors for use in processing actual microphone array data, as discussed below with respect to Equation 9. In addition, the IDOA prior model can also include a computed prior probability of each location in the region, if desired, to address the case where some regions of the signal field are more likely than others, such as, for example, a region in front of a PC having a linear microphone array.

Figure 5:
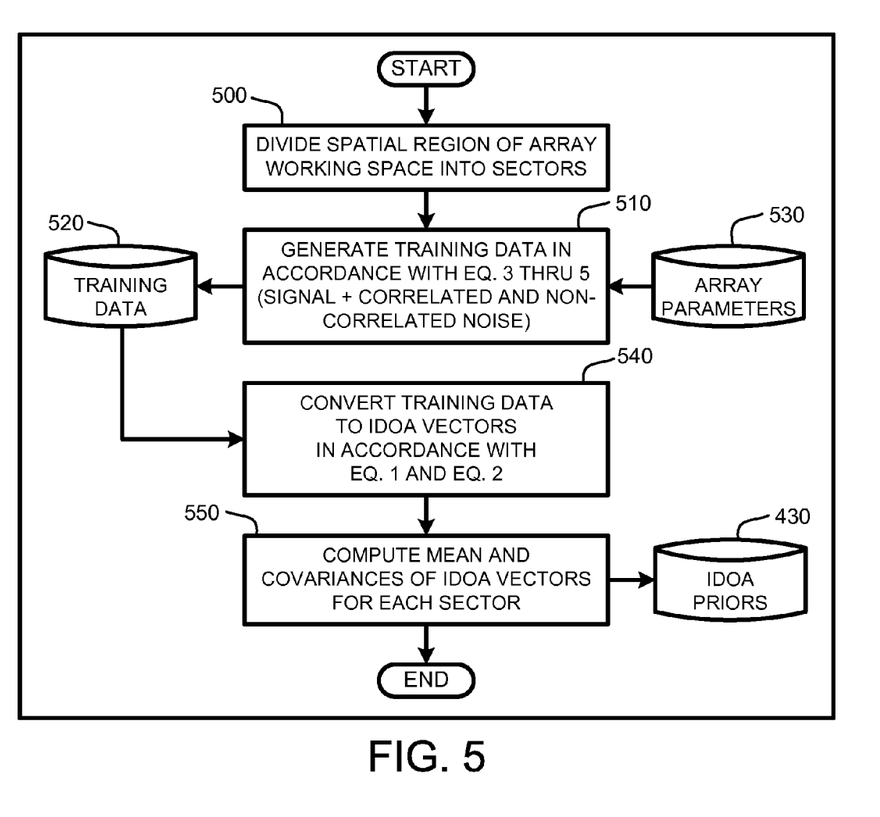
FIG. 5 illustrates a general system flow diagram that illustrates an exemplary method for training IDOA priors for use by the Sensor Array Post-Filter, as described herein.

As illustrated by FIG. 5, training of IDOA priors is accomplished by first dividing 500 the spatial region of the microphone array working space into a plurality of sectors. Given these sectors, and the parameters of the microphone array (i.e., the response models, $U_m$, 530 of each microphone in the array, the Sensor Array Post-Filter then generates 510 a plurality of training data points 520 for each of a plurality of spatial points in each sector. These data points are then converted 540 to IDOA vectors for pairs of microphones, as illustrated by Equations 1 and 2. Then, given these IDOA vectors for each sector, the mean and covariances of the IDOA vectors are computed 550 for each sector to generate the IDOA priors 430.

For example, in a tested embodiment of the Sensor Array Post-Filter, a 4-element linear microphone array with a length of 190 mm was used. The microphone array response model, $U_m$, typically either provided by the manufacturer or determined experimentally, was then used in computing the training data. In particular, the working area of the microphone array was assumed to span from −90° to 90° with 0° defined to be broadside, directly in front of the array. This spatial region was divided into 18 sectors with a 10° sector width.

Note that either more of fewer sectors can be used, as desired. In each sector, 100 locations were randomly generated from a uniform distribution of positions within that sector. Note that more or fewer locations within each sector can be used, as desired. However, using on the order of around 100 locations, with a large number of data points (i.e., signal contaminated by correlated and non-correlated noise) per location was observed to produce good results for the IDOA priors.

Again, it should be noted that either actual or synthetic data samples can be used for training. However, using synthetic data samples requires significantly less setup time than generating actual training samples at specific points throughout the working area of the array. While a single training set can be used, better training results are typically achieved using multiple sets of training data to better model real-world conditions. For example, in the above described tested embodiment, multiple sets of synthetic training data were created by using random combinations of signal to correlated noise ratios of $\psi$=20, 10 and 5 dB, and signal to non-correlated noise ratios of $\zeta$=30, 25 and 20 dB to contaminate speech signals. These synthetic data sets were then merged together, converted to IDOA vectors in accordance with Equations 1 and 2, and used to estimate the IDOA priors for the microphone array by computing the mean and covariances of the IDOA vectors for each sector. Again, such training is typically performed offline, with the results (i.e., the IDOA priors) then being provided for use with the microphone array for processing actual data.

Note that in related embodiments, rather than using random correlated and uncorrelated noise to contaminate signals for constructing the training data to be used to estimate the IDOA priors, if more is known about the environment that the microphone array will be used in, the training data can be tailored to fit that environment. For example, if it is known that certain types of fans or air-conditioning sources will produce specific types of ambient (i.e., correlated) noise in the location where the array will be used, then training data tailored towards that specific noise can be used to improve the performance of the final post-filter constructed by the Sensor Array Post-Filter. As noted above, the IDOA prior model can also include a consideration of whether particular regions of the signal field are more likely than other regions.

Further, in another related embodiment, multiple sets of training data, corresponding to multiple expected types of correlated noise sources and/or levels can be used to estimate different sets of IDOA priors. Then, whenever the IDOA priors are used to process actual microphone array data, the IDOA priors most closely corresponding to the actual environment that the microphone array is being used in is selected for use in creating the final post-filter.

3.4 Modeling Spatial Distributions of Speech and Noise:

In order to perform effective speech enhancement, the speech and noise at all points in the working space of the microphone array would ideally be modeled. However, since there are an infinite number of points in the working space, the sound field is quantized into a number of non-overlapping regions or sectors of some desired size or angular coverage. Then, the Sensor Array Post-Filter acts to accurately model the speech and noise in each sector. For example, in a tested embodiment using a linear microphone array acting to capture signals in a 180° field in front of the array, the spatial region was divided into 18 sectors with a 10° sector width.

Figure 6:
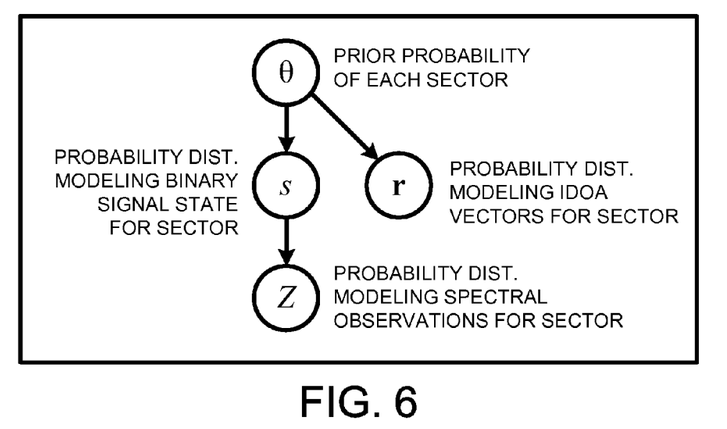
FIG. 6 illustrates a generative model that captures spatial distributions of signal and noise for each sector of a working space of a sensor array for implementing various embodiments of the Sensor Array Post-Filter, as described herein.

In general, this modeling can be illustrated by the generative model shown in FIG. 6. In this generative model, a discrete random variable $\theta$ is used to represent a sector of soundfield. Consequently, a distribution $p(\theta)$ indicates the prior probability of each sector in the soundfield. Further, associated with each sector is:

1) A probability distribution $p(r|\theta)$ that models the IDOA vectors in that sector; and
2) A binary random variable s that takes on one of two values associated with the speech state, i.e. s={speech, non-speech}, also governed by an associated distribution, $p(s|\theta)$.

In turn, the speech states (speech and non-speech) in a given sector have associated probability distribution functions (PDFs) that model the spectral observations, $p(Z|s,\theta)$, of the beamformer output.

The total likelihood of this generative model is given by the joint probability shown in Equations 6 and 7, where:

$$p(Z,r,s,\theta)=p(Z,r|s,\theta)p(s,\theta) \qquad \text{Equation 6}$$

$$=p(Z|s,\theta)p(r|\theta)p(s|\theta)p(\theta) \qquad \text{Equation 7}$$

Note that Z and r are conditionally independent given $\theta$. Further, the distributions of the spectral observations Z, observed at the beamformer output, and the IDOA vectors r are assumed to have a Gaussian distribution, such that:

$$p(Z,|s,\theta)=\mathcal{N}(Z;0,\sigma_{s,\theta}^2) \qquad \text{Equation 8}$$

$$p(r|\theta)=\mathcal{N}(r;\mu_\theta,\Phi_\theta) \qquad \text{Equation 9}$$

where it is assumed the spectral observations Z are zero mean.

The variable $\lambda$ is defined to be the set of all parameters of this model, i.e., $\lambda=\{\sigma_{s,\theta}^2,\mu_\theta,\Phi_\theta,\forall s,\theta\}$. As such, the problem is to estimate $\lambda$ based on the spectral values observed at the beamformer output, $\mathcal{Z}=\{Z_1, \ldots, Z_T\}$, and IDOA values $\mathcal{R}=\{r_1, \ldots, r_T\}$ that are derived from the array signals themselves.

In the absence of any prior information about the model parameters, the optimal estimate for their values can be obtained through Maximum Likelihood (ML) parameter estimation. However, If some knowledge about the model parameters is available in the form of a prior distribution $p(\lambda)$, then Maximum A Posteriori (MAP) estimation can be performed.

However, in either case, learning the model parameters is not straightforward because for each observation pair $\{Z_t,r_t\}$, the sector $\theta$ and speech state s that generated these observations are unknown and must be inferred. Inference in hidden variable problems such as this one is typically performed using an Expectation-Maximization (EM) algorithm. In general, EM operates by iteratively maximizing the conditional log likelihood of the complete data (observations plus hidden variables), given the observed data.

Unfortunately, while EM has been successfully applied in many hidden variable problems, it has the significant drawback in that it is a batch-mode algorithm. This causes two related problems for adaptive speech processing algorithms. First, because it requires a sequence of frames to be accumulated before parameter estimation can be performed, it is inherently unsuitable for online applications. In addition, because the prior distribution is assumed fixed over some time period, it cannot accurately model time-varying parameters.

3.5 Learning Model Parameters:

To remedy the batch-mode processing requirement of conventional EM solutions, the Sensor Array Post-Filter employs an incremental Bayes learning adaptation of EM. This Bayes learning-based adaptation of EM allows MAP estimation using EM to be performed in an online manner using a time-varying prior distribution over the model parameters. At each time step, this adaptive prior distribution is updated recursively using the posterior distribution over the hidden variables computed at the previous time step.

In order to use this approach, it is necessary to first define a prior distribution over model parameters $p(\lambda)$. Note that the following discussion assumes a microphone array capturing speech and noise signals. As such, the following discussion is restricted to the online updating of the speech and noise variances, with priors being defined for these parameters only. Clearly, different sensor arrays and different signal types will require priors for corresponding parameters.

To simplify the mathematics for purposes of explanation, the following discussion model precisions (inverse variances), rather than the variances directly. These precisions are modeled using gamma distributions, where the prior distribution of $$v_{s\theta} = \frac{1}{\sigma_{s\theta}^2}$$

is defined as illustrated by Equation 10, where:

$$p(v_{s\theta}|\phi_{s\theta}) = v_{s\theta}^{(\alpha_{s\theta} - 1/2)} \exp(-\beta_{s\theta} v_{s\theta}) \quad \text{Equation 10}$$

where $\phi_{s\theta} = \{\alpha_{s\theta}, \beta_{s\theta}\}$ are hyperparameters that characterize the gamma distribution for sector $\theta$ and speech state s. The prior over all model parameters $\lambda$ can then be defined as $$p(\lambda|\phi) = \prod_s \prod_\theta p(v_{s\theta}|\phi_{s\theta}) \quad \text{Equation 11}$$

Given this problem setup, the MAP EM algorithm with incremental Bayes learning can be defined as described below.

In particular, if $V_t = \{Z_t, r_t\}$ is defined to be the observed data for the frame at time t, then the time-varying EM likelihood function can be expressed as:

$$Q(\lambda, \lambda^{(t-1)}) = E[\log\{p(V_t, s, \theta|\lambda)\}V_t, \lambda^{(t-1)}] \quad \text{Equation 12}$$

$$= \sum_s \sum_\theta \log(p(V_t, s, \theta|\lambda))p \quad \text{Equation 13}$$

$$(s, \theta|V_t, \lambda^{(t-1)})$$

Therefore, the MAP estimate of $\lambda$ at time t can be computed by combining $Q(\lambda, \lambda^{(t-1)})$ with the prior distribution $p(\lambda|\phi)$ to obtain the following EM algorithm:

E-Step:

$$R(\lambda, \lambda^{(t-1)}) = Q(\lambda\lambda^{(t-1)}) + \rho \log p(\lambda|\phi^{(t-1)}) \quad \text{Equation 14}$$

M-Step:

$$\lambda^{(t)} = \underset{\lambda}{\operatorname{argmax}} R(\lambda, \lambda^{(t-1)}) \quad \text{Equation 15}$$

where $\rho$ is a "forgetting factor" with $0 < \rho \leq 1$. Note that the use of a forgetting factor is known to those skilled in the art, and is used to control the influence of new input data relative to the past observations.

To perform the E-step in Equation 14, it is necessary to compute the posterior probability $\gamma_{s\theta}^{(t)} = p(s,\theta|V_t) = p(s,\theta|Z_t, r_t)$. This expression can be computed exactly from the distributions in the model using Bayes rule. However, in one embodiment, to simplify the computations, it is assumed that the speech state and the sector are independent. While this assumption is not strictly true, it has been observed to produce good results for post-filter generation with real-world microphone array signals. Thus, assuming independence of the speech state and sector, the posterior, $\gamma_{s\theta}^{(t)}$, can be approximated as illustrated by Equation 16, where:

$$\gamma_{s\theta}^{(t)} \approx p(\theta|r_t)p(s|Z_t) \quad \text{Equation 16}$$

where $p(\theta|r_t)$ can be computed from Equation 9 using Bayes rule, as illustrated by Equation 17, where:

$$p(\theta|r_t) = p(r_t|\theta)p(\theta) \Big/ \sum_{\theta'} p(r_t|\theta')p(\theta') \quad \text{Equation 17}$$

In addition, the speech state posterior, $p(s|Z_t)$, is computed using a conventional voice activity detector (VAD) that outputs probability of speech activity in each frequency bin. As such, $\gamma_{s\theta}^{(t)}$ is easily computed.

After computing $\gamma_{s\theta}^{(t)}$, the model parameters are updated by performing the M-step in Equation 15. This is done by taking the derivative of $R(\lambda, \lambda^{(t-1)})$ with respect to $\lambda$, setting the result equal to zero, and solving for $\lambda$ in the usual manner. This leads to the following update expression for the speech and noise variances in each sector:

$$\sigma_{s\theta}^{2(t)} = \frac{1}{v_{s\theta}^{(t)}} = \frac{2\rho\beta_{s\theta}^{(t-1)} + \gamma_{s\theta}^{(t)}|Z_t|^2}{\rho(2\alpha_{s\theta}^{(t-1)} - 1) + \gamma_{s\theta}^{(t)}} \quad \text{Equation 18}$$

As expected, the variances for speech and noise in all sectors are updated as a linear combination of the previously seen data (represented by hyperparameters $\alpha_{s\theta}$ and $\beta_{s\theta}$) and the current spectral observation $Z_t$ from the beamformer output. However, as illustrated in Equation 18, not all model parameters are updated uniformly. In particular, the observed data in the current frame will influence the model parameters in a particular sector and speech state in proportion to its posterior probability.

At each time step, the hyperparameters $\phi$ of the prior distribution $p(\lambda|\phi)$ are also updated using the same maximization procedure. This generates the following updated hyperparameters:

$$\alpha_{s\theta}^{(t)} = \rho(\alpha_{s\theta}^{(t-1)} - 0.5) + 0.5 + 0.5\gamma_{s\theta}^{(t)} \quad \text{Equation 19}$$

$$\beta_{s\theta}^{(t)} = \rho\beta_{s\theta}^{(t-1)} + 0.5\gamma_{s\theta}^{(t)}|Z_t|^2 \quad \text{Equation 20}$$

which define a new prior distribution $p(\lambda|\phi^{(t)})$ for the next time step.

3.6 Post Filter Construction from Distributions of Speech and Noise:

The learning algorithm described in Section 3.5 generates online MAP estimates of the variances of the speech and noise in every frequency bin and every sector. To create the final post-filter, H, the spatially-distinct parameter estimates are first merged into a single speech variance and a single noise variance. This is done by marginalizing the speech and noise distributions over all sectors.

In particular, for the frame at time t, the global speech variance, $\sigma_{s=1}^{2(t)}$, is computed as illustrated by Equation 21, where:

$$\sigma_{s=1}^{2(t)} = \sum_\theta \gamma_{s=1,\theta}^{(t)} \sigma_{s=1,\theta}^{2(t)} \Big/ \sum_\theta \gamma_{s=1,\theta}^{(t)} \qquad \text{Equation 21}$$

Similarly, the global noise variance, $\sigma_{s=0}^{2(t)}$, is computed as $$\sigma_{s=0}^{2(t)} = \sum_\theta \gamma_{s=0,\theta}^{(t)} \sigma_{s=0,\theta}^{2(t)} \Big/ \sum_\theta \gamma_{s=0,\theta}^{(t)} \qquad \text{Equation 22}$$

In constructing the final post-filter, it is assumed that the sector that contains the desired target signal is known a priori. Consequently, the post filter acts to suppress both noise that comes from any direction, and any speech that originates from a direction (sector) other than the target sector $\theta_T$. In order to achieve this directional suppression in the final post-filter, $\eta^{(t)}$ is defined as the total posterior probability that the observed signal was speech and that the observed signal came from a direction other than the desired target direction. This term can be computed as illustrated by Equation 17 where:

$$\eta^{(t)} = \sum_{\theta \neq \theta_T} \gamma_{s=1,\theta}^{(t)} \qquad \text{Equation 23}$$

In other words, $\eta^{(t)}$ represents an unwanted speech signal, coming from some sector other than the target sector, which should be suppressed.

Then, using $\eta^{(t)}$, the final noise estimate, $\sigma_N^{2(t)}$, including both unwanted speech signals from non-target sectors and noise from all sectors, is computed for the post-filter as illustrated by Equation 24, where:

$$\sigma_N^{2(t)} = \eta^{(t)} \sigma_{s=1}^{2(t)} + (1-\eta^{(t)}) \sigma_{s=0}^{2(t)} \qquad \text{Equation 24}$$

Therefore, if the current frame has a high probability of being either speech that originated from the target sector or noise from any sector, $\eta^{(t)}$ will be close to 0, and the noise estimate will be dominated by the noise variance $\sigma_{s=0}^{2(t)}$. On the other hand, if the posteriors indicate that the current frame is speech that originates from an interfering sector, $\eta^{(t)}$ will approach 1, and the noise estimate will be dominated by that sector's speech model.

The final noise estimate, $\sigma_N^{2(t)}$, illustrated in Equation 24 is then used to create a post-filter using any of a number of conventional gain-based suppression rules. Examples of these conventional gain-based suppression rules include, but are not limited to, Weiner noise suppression, ML spectral amplitude estimator-based noise suppression, MMSE short term spectral amplitude estimator-based noise suppression, joint MAP spectral amplitude estimator-based noise suppression, MMSE spectral power estimator-based noise suppression, etc. Clearly, once the Sensor Array Post-Filter has created the final noise estimate, $\sigma_N^{2(t)}$, any desired conventional gain-based suppression rule can be used to construct the final post-filter.

For example, in a tested embodiment of the Sensor Array Post-Filter, the conventional and well known Wiener noise suppression rule based on a priori SNR estimation was used to construct the final post-filter. In particular, the a priori SNR is estimated as:

$$\xi^{(t)} = |Z_t|^2/\sigma_N^{2(t)} - 1 \qquad \text{Equation 25}$$

with $\xi^{(t)}$ then being used to generate the final post-filter, H, as illustrated by Equation 26, where:

$$H_t = \xi^{(t)}/(1+\xi^{(t)}) \qquad \text{Equation 26}$$

Further, it should be noted that in additional embodiments, conventional smoothing techniques, such as, for example, a conventional decision-directed smoothing approach, are used to smooth the estimates of $\xi^{(t)}$ prior to generating the final post-filter illustrated in Equation 26.

Finally, once the final post-filter $H_t$ has been computed, it is is applied to the microphone array output to generate the final output signal, $\hat{X}_t$, as illustrated by Equation 27, where:

$$\hat{X}_t = H_t Z_t \qquad \text{Equation 27}$$

At this point, as discussed in Section 2.2, the frequency domain output signal, $\hat{X}_t$, is either stored for later use, processed in the frequency domain to perform operations such as, for example, noise suppression, encoding or transcoding the signal (for storage or transmission), scaling the signal, watermarking the signal, identifying the signal using conventional signal fingerprinting techniques, etc., or transformed back to the time domain for storage or playback, as desired.

The foregoing description of the Sensor Array Post-Filter has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the Sensor Array Post-Filter. It is intended that the scope of the invention be limited not by this detailed description, but rather by the claims appended hereto.

What is claimed is:

1. A computer-readable medium having computer executable instructions stored thereon for generating an adaptive post-filter for use in improving a signal to noise ratio (SNR) of a target signal, said computer executable instructions comprising:

receiving a set of frequency domain transform coefficients corresponding to overlapping frames of an input signal for each of a plurality of sensors comprising a sensor array;

using the frequency domain transform coefficients to compute instantaneous direction of arrival (IDOA) vectors corresponding to inter-sensor phase differences for each of a plurality of non-repeating sensor pairs;

using a set of pre-computed IDOA prior distributions to estimate a probabilistic direction from which each IDOA vector originated;

applying a beamformer to the frequency domain transform coefficients to produce a beamformer signal corresponding to a target channel;

constructing a probabilistic model of a spatial and spectral signal field corresponding to a working space of the sensor array from the IDOA vectors, the probabilistic direction of each IDOA vector, and the beamformer signal;

for each frame of the input signal, estimating signal and noise variances from the probabilistic model and updating parameters of the probabilistic model, and constructing an adaptive post-filter from the estimated signal and noise variances and the beamformer output signal.

2. The computer-readable medium of claim 1 further comprising instructions for applying the adaptive post-filter to the beamformer signal to generate a frequency domain output signal.

3. The computer-readable medium of claim 2 wherein applying the adaptive post-filter to the beamformer signal attenuates signals originating from directions other than a target direction, and noise sources coming from all directions.

4. The computer-readable medium of claim 2 further comprising instructions for applying an inverse transform to the frequency domain output signal to generate a time domain output signal.

5. The computer-readable medium of claim 2 further comprising instructions for encoding the frequency domain output signal.

6. The computer-readable medium of claim 1 wherein the probabilistic model is constructed using incremental Bayesian learning to perform Maximum A Posteriori (MAP) estimation for iterative expectation-maximization (EM) based modeling of the signal and noise variances.

7. The computer-readable medium of claim 1 wherein the set of IDOA prior distributions is estimated from a set of training data.

8. The computer-readable medium of claim 7 wherein estimating the IDOA prior distributions from the set of training data comprises instructions for:
dividing a spatial region corresponding to a working space of the sensor array into a plurality of regions;
generating a plurality of training data elements for each of a plurality of spatial points within each region, each training data element representing a signal contaminated by some amount of correlated and non-correlated noise;
converting the training data elements to training IDOA vectors corresponding to inter-sensor phase differences for each of a plurality of non-repeating sensor pairs;
computing means and covariances of the training IDOA vectors to generate the IDOA prior distributions; and
computing a prior probability of each location in the region.

9. A method for processing a beamformer output to attenuate unwanted signals and noise, comprising steps for:
applying a beamformer to frequency domain transform coefficients derived from each channel of a sensor array to produce a beamformer signal corresponding to a target channel;
computing inter-sensor phase differences representing instantaneous direction of arrival (IDOA) vectors for each of a plurality of non-repeating sensor pairs from the frequency domain transform coefficients;
using a set of pre-computed IDOA prior distributions to estimate a probabilistic direction from which each IDOA vector originated;
constructing a probabilistic model from the IDOA vectors, the probabilistic directions, and the beamformer signal;
estimating signal and noise variances from the probabilistic model;
constructing an adaptive post-filter from the estimated signal and noise variances and the beamformer output signal; and
applying the adaptive post-filter to the beamformer signal to generate a frequency domain output signal exhibiting attenuation of signals originating from non-target directions and attenuation of noise from all directions.

10. The method of claim 9 further comprising applying an inverse transform to the frequency domain output signal to generate a time domain output signal.

11. The method of claim 10 wherein the sensor array is a microphone array, and wherein the time-domain output signal is a speech signal representing originating speech from a target direction.

12. The system of claim 11 further comprising steps for providing a real-time playback of the speech signal.

13. The method of claim 9 wherein the probabilistic model is constructed using incremental Bayesian learning to perform Maximum A Posteriori (MAP) estimation for expectation-maximization (EM) based modeling of the signal and noise variances.

14. The method of claim 9 wherein the IDOA prior distributions are computed from one or more sets of training data.

15. The method of claim 14 wherein computing the IDOA prior distributions comprises instructions for:
dividing a spatial region corresponding to a working space of the sensor array into a plurality of regions;
generating a plurality of training data elements for each of a plurality of spatial points within each region, each training data element representing a signal contaminated by some amount of correlated and non-correlated noise;
converting the training data elements to training inter-sensor phase difference training vectors for each of a plurality of non-repeating sensor pairs; and
computing means and covariances of the training vectors to generate the IDOA prior distributions.

16. A system for modeling a working space of sensor array, comprising using a computing device to:
divide a spatial region corresponding to a working space of the sensor array into a plurality of regions;
generating a plurality of training data elements for each of a plurality of spatial points within each region, each training data element representing a signal contaminated by some amount of correlated and non-correlated noise;
converting the training data elements to instantaneous direction of arrival (IDOA) vectors corresponding to inter-sensor phase differences for each of a plurality of non-repeating sensor pairs;
computing means and covariances of the training IDOA vectors and setting a prior probability of each location or region, to generate the IDOA prior distributions; and
using the IDOA prior distributions to model the working space of the sensor array, said IDOA prior distributions being stored on a computer readable medium for use in processing signals captured by the sensor array.

17. The system of claim 16 wherein generating each of the plurality of training data elements comprises constructing a synthetic data element comprising a combination of a synthetic point signal source, a random synthetic point noise source, and random synthetic sensor array noise, as a function of signal capture parameters of the sensor array and signal propagation characteristics within a working space of the sensor array.

18. The system of claim 16 further comprising using the IDOA prior distributions to estimate a probabilistic direction of a target signal captured by the sensor array.

19. The system of claim 18 further comprising tracking the target signal over time by updating the estimate of the probabilistic direction of the target signal for each consecutive frame of the target signal.

20. The system of claim 19 wherein the target signal is a beamformer output, and further comprising improving a signal to noise ratio of the target signal by applying an adaptive post filter to the target signal.

* * * * *